Figure 1:
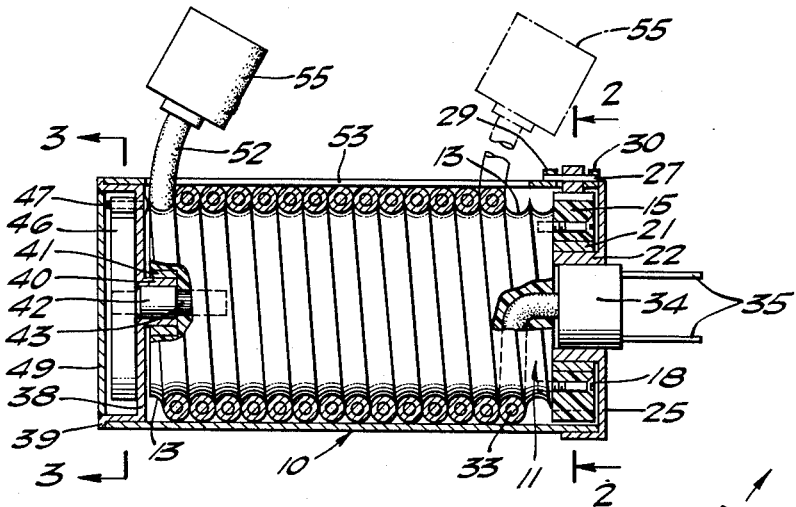

Sept. 8, 1964    J. R. McWILLIAMS ETAL    3,147,833
COILER FOR FLEXIBLE MEMBERS SUCH AS ELECTRIC CORDS
Filed Dec. 19, 1960

JOHN R. McWILLIAMS
LARRY D. KESTER
INVENTORS

BY Edward C Walsh

ATTORNEY

United States Patent Office 3,147,833
Patented Sept. 8, 1964

3,147,833
COILER FOR FLEXIBLE MEMBERS SUCH AS ELECTRIC CORDS
John R. McWilliams, 25351 Los Flores, and Larry D. Kester, 25377 E. 35th St., both of San Bernardino, Calif.
Filed Dec. 19, 1960, Ser. No. 76,567
3 Claims. (Cl. 191—12.4)

This invention relates to a device or appliance for coiling or winding up and uncoiling flexible elements such as, for example, electric cords. The invention is exemplified herein as being a coiler and uncoiler for electric cords such as may be used with electric razors.

The device or appliance of the invention is a relatively small, compact, simplified device from which a flexible element may be unwound or uncoiled simply by exerting a pull on it.

The device automatically coils or winds up the electric cord or other flexible member upon release of a manually actuatable release member. The utility of the device or appliance is that when not in use, the flexible member such as the electric cord is neatly wound or coiled in the appliance which is very compact, easily stored and always ready and available for use.

A primary object of the invention is to provide a device or appliance as in the foregoing for coiling and uncoiling a flexible member such as, more particularly, an electric cord for razors or the like.

It is common in the prior art that electric cords such as razor cords are left hanging loose or draped over fixtures in the bathroom or other similar places. It is usual that they are left plugged into the wall socket or other socket with the plug or adapter on the other end of the cord left exposed and subject to possible short circuits between the terminals and similar contingencies. Furthermore, the cords under such circumstances are subject to wear and possible deterioration of the installation such as to expose the electric wires further creating hazards in the way of possible short circuits, starting of fires and injury to humans. The herein invention overcomes all of these disadvantages in the manner described in the foregoing.

A more particular object of the invention is to provide a coiler and uncoiler as in the foregoing comprising a rotatable spool or drum member on which the cord is wound, the device having means for automatically coiling or winding the cord and being particularly characterized in that the plug on the end of the cord which plugs into the wall socket is positioned in an end of the device and is freely rotatable with the drum or spool.

Another object is to provide an appliance as in the foregoing object wherein the drum or spool is mounted within a relatively small, compact container or housing which can be held in one hand while the cord is unwound from the drum, spring drive means being provided for winding up or coiling the cord and the device having pawl and ratchet means for restraining rotation of the drum after the cord has been pulled out.

Another object is to provide a device or appliance as in the foregoing wherein the housing or container is cylindrical having an end part with the plug which plugs into the wall mounted centrally thereof aligned with the axis of the drum or spool.

Another object is to provide a device or appliance as in the foregoing wherein the drum or spool is provided with a helical groove to receive the flexible member or electric cord and the housing or container is cylindrical having an axial slot through which the cord moves as it is uncoiled from the drum or spool.

Figure 2:
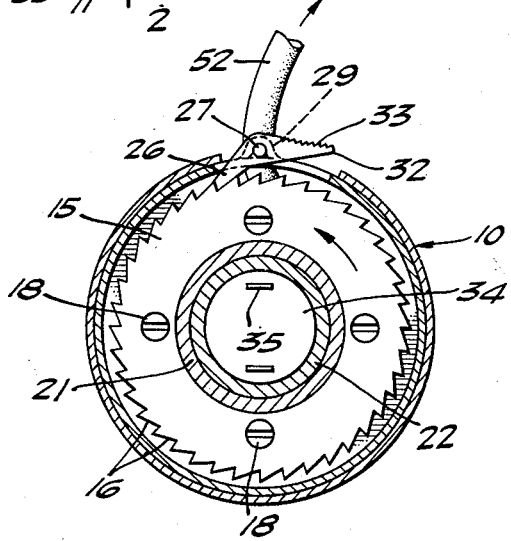
Figure 3:
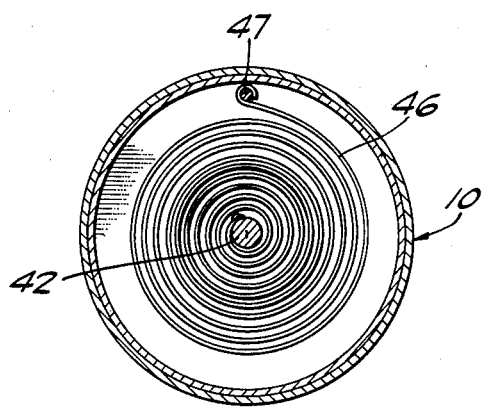

Further objects and additional advantages will become apparent from the following detail description and annexed drawings, wherein:

FIG. 1 is a sectional view of a prefererd form of the invention;
FIG. 2 is a sectional view taken along the line 2—2 of FIG. 1; and
FIG. 3 is a sectional view taken along the line 3—3 of FIG. 1.

The figures of the drawing referred to in the foregoing are representative of a preferred form of the invention exemplifying its application as a device for coiling and uncoiling an electric cord, such as a razor cord. It is to be be understood that the invention may have other applications in other environments and that the disclosure herein is to be interpreted as illustrative of them.

The device as represented in FIG. 1 comprises a cylindrical container or housing 10 which may be made of a suitable material such as aluminum or plastic or the like. Mounted within the housing is a coiling drum or spool 11 which is preferably provided with a continuous helical groove as designated at 13. The drum or spool may be made of any suitable material and as shown in FIG. 1, it is made of a composition preferably plastic. Attached to one end of the drum is a disc member 15 made of similar material which is notched at the periphery to provide continuous ratchet teeth as shown at 16 in FIG. 2. This disc or ratchet wheel is attached to the end of the drum 11 by screws as shown at 18. The disc member 15 has a central opening in which is press fitted a metal bushing 21. Journalled in the bushing 21 is a boss or bushing 22 extending inward centrally from a metal end cap 25 which is suitably attached to the end of the housing 10. The end member 25 may be in the form of a cap having a flange engageable with the end of the housing 10.

Numeral 26 designates a pawl member pivoted on a pivot pin or shaft 27 which is pivotally mounted in brackets or lugs 29 and 30 on an end part of the housing 10. The pawl 26 has an extending finger or thumb piece 32 which is knurled as shown at 33 whereby it can be conveniently tilted or pivoted about the shaft 27 to release the pawl 26 from the ratchet teeth 16.

Numeral 33 designates a flexible member shown as an electric cord wound on the drum 11. At one end of the cord is a plug member 34 having extending prongs or terminls 35 for plugging into a wall socket or the like. As shown, the plug member 34 is circular and it fits into the bushing 22 in the end cap 25. That is, it is aligned with the axis of the housing 10 and the drum 11.

At the other end of the housing 10 is an end cap 38 having flange 39 abutting the end of the housing 10 and having an inwardly extending cylindrical boss or bushing 40. This bushing 40 fits within a bushing 41 fitted in an opening in the end of the spool or drum 11. The drum 11 has an axle or spindle as designated at 42 journalled in the bushing 40 and having a splined end 43 extending into the spool or drum 11.

The end cap 38 is depressed inwardly as shown and in it is mounted a spring which is shown representatively as being a clock-type of spring as designated at 46, the outer end of which is secured on a pin 47. This spring is within the space formed by the inwardly depressed end cap 30, the cap being closed by an end disc 49. The inner end of the spring 46 is secured to the end of the axle or spindle 42 of the drum 11.

As shown in FIG. 1, the cord 33 is wrapped or wound on the drum 11 and has one end 52 extending through the end of a longitudinal slot 53 in the container or housing 10. On the end 52 of the cord is a plug or adapter 55 of the type which plugs into or attaches to a razor or other comparable type of appliance.

In the operation of the device the housing or container 10 may be held in one hand and then a pull exerted on the end 52 of the cord to unwind it. When this happens, the drum or spool 11 rotates to unwind the cord and this action winds up the spring 46 which is a torsion spring. It is to be understood that other types of springs or driving devices may be used. During the unwinding or unwrapping of the cord 33, the end which is being unwound moves longitudinally through the slot 53 towards the other end of the housing. During the unwinding, the other end of the cord, that is the end attached to the plug 34 and the plug as well are free to rotate with the drum, the plug rotating in the bushing 22. During the unwinding, the ratchet wheel 15 rotates in a counter-clockwise direction as shown in FIG. 2 and when the desired amount of cord has been unwound, the pawl 26 automatically engages a ratchet tooth and prevents return rotation of the ratchet wheel and the drum. The ratchet 26 may be provided with a spring if necessary to bias it towards engagement with the ratchet teeth but normally such a biasing spring is not necessary. After the cord has been pulled out in the manner described, the person using the applicance then simply plugs the plug 34 into the wall socket and the appliance is then held in that position occupying a minimum of space. When the person using the appliance is through using it, he simply grasps it in one hand and withdraws the plug 34 from the wall socket. He then merely depresses the finger piece 33 of the pawl 32 which allows the ratchet wheel 15 to rotate so that the drum 11 rotates under the influence of the spring 46 and the cord is then re-coiled or wound up on the spring 11. The cord is wrapped in uniformly spaced convolutions by reason of the helical groove 13, the end 52 moving back to the position shown in FIG. 1.

From the foregoing, those skilled in the art will observe that the invention provides a simplified inexpensive but highly useful, compact and effective device for coiling and uncoiling flexible members, such as electric cords and maintaining them stored in a neat and safe way occupying a minimum of space. The invention eliminates the unsightly usage and exposure of flexible members such as cords and avoids dangers of short circuits, fires and related injuries to human beings.

The foregoing disclosure is representative of a preferred form of the invention and is to be interpreted in an illustrative rather than a limiting sense, the invention to be accorded the full scope of the claims appended hereto.

What is claimed is:

1. As an article of manufacture, a device having an elongated flexible electrical element comprising in combination, a housing, a rotatable member adapted to have the flexible element wound or coiled on it, mounting means providing bearings for the rotatable member, a plug extending axially from an end part of the housing, said plug having electrical contactors positioned for making electrical contact with the flexible element and having contiuous uninterrupted electrical connection therewith said plug being structurally separate from the rotatable member, said flexible electrical element being free from other electrical contacts or interruptions entirely throughout its length, said mounting means including bushings supporting the rotatable member; the said plug being rotatably journaled on the inside of one of said bushings, and said rotatable member having a part journaled on the exterior of said one bushing.

2. As an article of manufacture, a device having an elongated flexible electrical element comprising in combination, a housing, a rotatable member adapted to have the flexible element wound or coiled on it, mounting means providing bearings for the rotatable member, plug extending axially from an end part of the housing, said plug having electrical contactors positioned for making electrical contact with the flexible element and having continuous uninterrupted electrical connection therewith, said plug being structurally separate from the rotatable member and said flexible electrical element being free from other electrical contacts or interruptions entirely throughout its length, and said mounting means comprising bushings, the said plug being rotatably journaled on the inside of one of said bushings, and said rotatable member having a part journaled on the exterior of said one bushing.

3. As an article of manufacture, a device having an elongated flexible electrical element comprising in combination, a housing, a rotatable member adapted to have the flexible element wound or coiled on it, mounting means providing bearings for the rotatable member, a circular plug extending axially from an end part of the housing, said plug having electrical contactors positioned for making electrical contact with the flexible element and having continuous uninterrupted electrical connection therewith, said plug being structurally separate from the rotatable member, said flexible electrical element being free from other electrical contact or interruptions entirely throughout its length, said mounting means including bushings supporting the rotatable member including an inwardly extending bushing at one end of the housing, the said plug being directly journaled on the inside of said one bushing, and said rotatable member having means journaled on the outside of said one bushing.

References Cited in the file of this patent

UNITED STATES PATENTS

| | | |
|---|---|---|
| 1,591,901 | Watts | July 6, 1926 |
| 1,936,085 | Grant | Nov. 21, 1933 |
| 1,952,480 | Thompson | Mar. 27, 1934 |
| 1,978,734 | Apple et al. | Oct. 30, 1934 |
| 1,978,734 | Apple et al. | Oct. 30, 1934 |
| 2,063,234 | Ehrlich | Dec. 8, 1936 |
| 2,585,070 | Allard | Feb. 12, 1952 |
| 2,976,374 | Poulsen | Mar. 21, 1961 |
| 3,056,863 | Johnson | Oct. 2, 1962 |